United States Patent
Van Montfort et al.

(10) Patent No.: US 7,860,356 B2
(45) Date of Patent: Dec. 28, 2010

(54) BODY AND AN ELECTRONIC DEVICE

(75) Inventors: Vincent Johannes Jacobus Van Montfort, Heerlen (NL); Fransiscus Gerardus Coenradus Verweg, Heerlen (NL)

(73) Assignee: Chimei Innolux Corporation, Chu-Nan (TW)

( * ) Notice: Subject to any disclaimer, the term of this patent is extended or adjusted under 35 U.S.C. 154(b) by 0 days.

(21) Appl. No.: 10/570,871

(22) PCT Filed: Aug. 19, 2004

(86) PCT No.: PCT/IB2004/051495

§ 371 (c)(1),
(2), (4) Date: Mar. 7, 2006

(87) PCT Pub. No.: WO2005/024873

PCT Pub. Date: Mar. 17, 2005

(65) Prior Publication Data

US 2007/0014507 A1    Jan. 18, 2007

(30) Foreign Application Priority Data

Sep. 8, 2003   (EP)   .................................. 03103318

(51) Int. Cl.
G02B 6/12   (2006.01)
(52) U.S. Cl. ........................... 385/14; 385/131; 362/630
(58) Field of Classification Search .................... 385/14, 385/129–131, 88; 362/617–634, 31
See application file for complete search history.

(56) References Cited

U.S. PATENT DOCUMENTS 5,521,342 A * 5/1996 Bartley et al. ............... 200/5 A
5,708,428 A   1/1998 Phillips
5,947,578 A * 9/1999 Ayres ......................... 362/629

(Continued)

FOREIGN PATENT DOCUMENTS

EP        0733288 B1      9/1996

(Continued)

OTHER PUBLICATIONS

International Search Report for International Application No. PCT/IB2004/051495 Contained in International Pubblication No. WO2005/024873.

(Continued)

*Primary Examiner*—Ellen Kim
(74) *Attorney, Agent, or Firm*—Liu & Liu

(57) ABSTRACT

The body (10) comprises a first portion of transparent material and is provided with embedded optical and other elements (12, 13, 22, 16) and a pattern of conductors 15 used for interconnection and electrical contacting of the elements (12, 13, 22,16). The first portion constitutes a light path from the optical elements (12) to either other opto-electronic elements or electro-optical elements embedded in the body (10) or present at a surface thereof. The electro-optical element is for instance a liquid-crystalline display (20) and the optical elements (12) are for instance light-emitting diodes, which are used for backlighting the display (20). The body (10) has a three-dimensional shape derived from its application and is preferably fitted for mechanical attachment of external components, that together constitute a device (100).

12 Claims, 11 Drawing Sheets

U.S. PATENT DOCUMENTS

| | | | |
|---|---|---|---|
| 5,975,711 A | 11/1999 | Parker et al. | |
| 6,079,838 A * | 6/2000 | Parker et al. | 362/617 |
| 6,501,897 B1 | 12/2002 | German et al. | |
| 6,930,260 B2 * | 8/2005 | Clegg et al. | 200/5 A |
| 6,964,528 B2 * | 11/2005 | Korenaga et al. | 385/88 |
| 2003/0123245 A1 | 7/2003 | Parker et al. | |
| 2004/0008952 A1 * | 1/2004 | Kragl | 385/88 |

FOREIGN PATENT DOCUMENTS

| | | |
|---|---|---|
| EP | 1207685 A2 | 5/2002 |
| GB | 2229864 A | 10/1990 |
| WO | WO2004047181 A1 | 6/2004 |

OTHER PUBLICATIONS

Written Opinion of the International Searching Authority for International Application No. PCT/IB2004/051495.

* cited by examiner

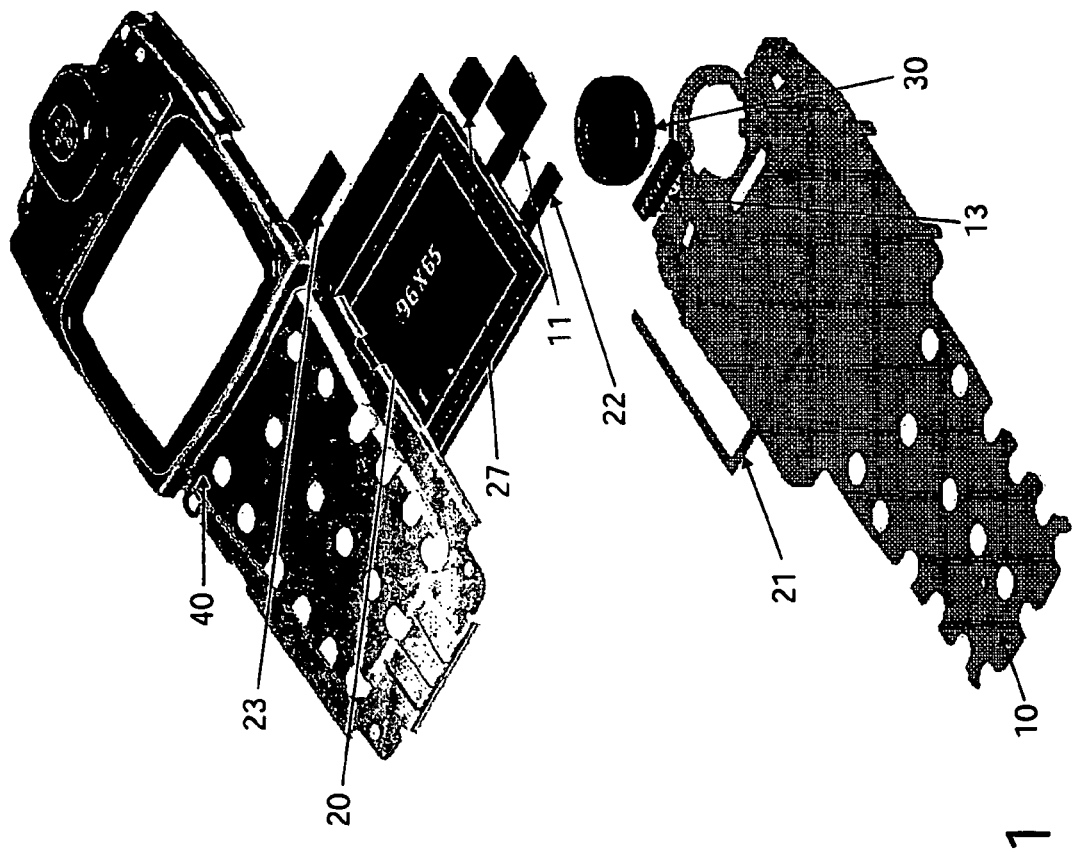
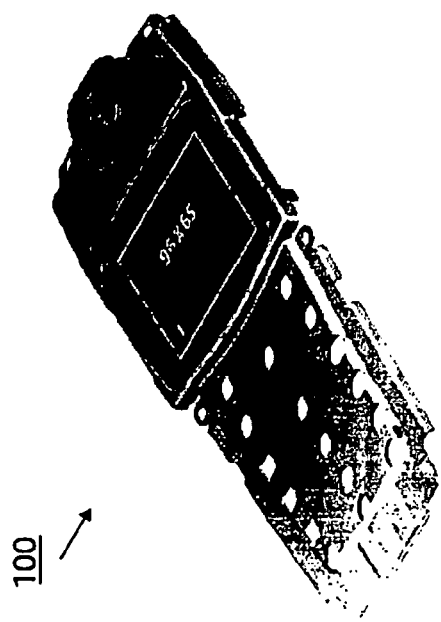
FIG.1

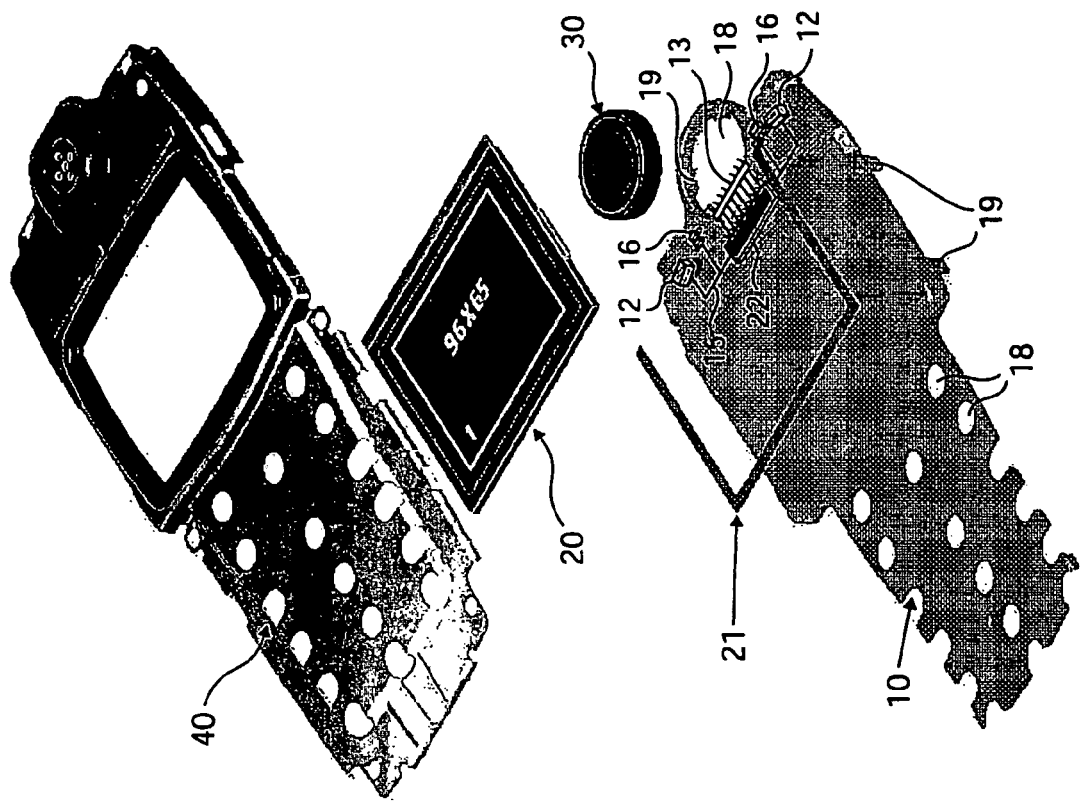
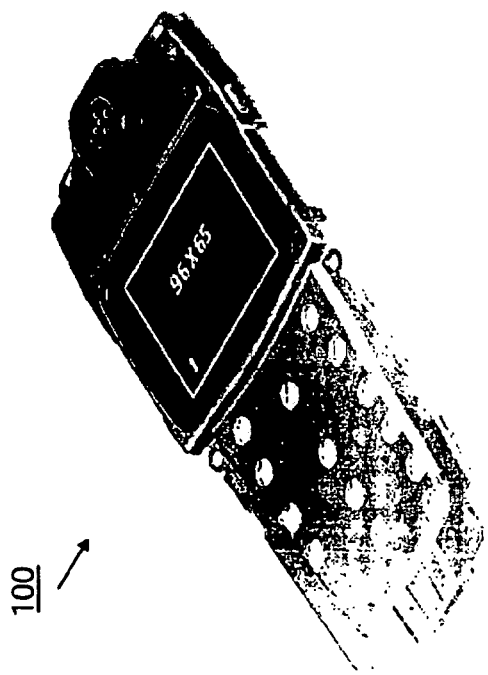
FIG. 2

BODY AND AN ELECTRONIC DEVICE

The invention relates to a body having a three-dimensional shape derived from its application and comprising a first portion with a transparent, electrically insulating material constituting a light path to an optical element. The invention further relates to an electronic device comprising such a body and an optical element.

Such a body and such an electronic device are known as parts of mobile phones. Particularly, the body therein constitutes a light-guide structure and the optical element is a light-emitting diode. Furthermore, a display is present. This known electronic device will be further explained with reference to FIG. 1, which is a diagrammatic, perspective, exploded view.

The device 100 comprises a transparent body 10 acting as a light guide and as a mechanical support. A display 20 is attached to the body 10 through a double sided tape 21. The display is, in this example, a liquid crystalline display and is provided with a glass surface to which there is attached an integrated circuit for addressing purposes, also known as driver IC 22. Furthermore, there is provided a flexible printed circuit board 1, to which various components are attached. At least two of these components are the light-emitting diodes 12 (not shown), which are provided with a lens. The display 20 and a connector 13 are also electrically connected to the flexible printed circuit board 11. Through this connector 13 the display and the other components are provided with energy and signals. The device 100 further comprises a loudspeaker 30, a casing 40, which is in this case a rubber overmolded bezel, as well as foam tapes 27 to obtain the required mechanical stability. Further, there is provided a black sticker 23. The transparent body 10 is provided with holes 18 and clamping means 19 for mechanical attachment of the loudspeaker 30, the casing 40 and non-shown buttons.

It is a disadvantage of the known device that the resulting optical performance is not optimal. The presence of the light-emitting diodes 12 on the flexible board 11 leads for instance to a relatively wide margin of tolerance in their directivity. This may lead to a backlighting of the display that is less uniform than desired.

It is therefore an object of the invention to provide a device of the kind mentioned in the opening paragraph having improved optical performance.

It is a further object to provide a body suitable for such a device.

The object relating to the body is achieved in that the body is provided with a pattern of electrical conductors, and in said body at least one optical element is embedded, the optical element being electrically connected to the pattern of conductors, the pattern of conductors being provided with electrical connection means that are laterally displaced with respect to the optical element.

The object relating to the device is achieved in that it comprises the body of the invention and an opto-electrical or electro-optical element attached to the surface of the body.

The invention is based on the insight that the optical element and the conductors that used to be present in a separate printed circuit board are embedded in the body itself. This has substantial advantages with respect to the optical performance. First of all, all relevant components are attached directly to one and the same carrier, which is the body. The margin of tolerance of the prior art, resulting from both the attachment of components to a board and the attachment of the board to the body, is thereby reduced. Secondly, the number of interfaces in the light path between the optical element and the display is reduced. This results from the inclusion of the optical elements in the body. Furthermore, the design of the pattern of conductors may be optimized, such that the optical elements are positioned as favorably as possible in relation to the display.

It is an advantage of the present invention that the mechanical stability of the resulting device is good, which can be attributed to the fact that the body serves as an encapsulation of components. As a result of this function of encapsulation, the body may have a larger thickness without an increase of the dimensions of the device as a whole.

It is a further advantage of the present invention that the amount of assembly is reduced. In fact, the assembly process is limited to a first step in which the optical elements, and if so desired any further electrical elements are provided on a carrier, and to a second step of assembly of some larger elements at the surface of the body. After the provision of the elements of the carrier, the body is provided using a molding technique, such as insert molding. Thereafter, a releasable layer is removed from the foil and only the pattern of conductors is left as part of the body.

It is another advantage that the present invention can be applied in a much wider range of products than the device known from the prior art. The prior art device includes the combination of a light-emitting diode and a display. Possible applications include optical transmission, optimized light output based on input of a sensor, optical discs including an integrated circuit for copy protection and a photodiode for energy transfer to the integrated circuit; cameras; and modules comprising optical and other functionalities.

From GB 2,229,864 a molded printed circuit board is known having a desired three-dimensional shape and being provided with a pattern of electrical conductors. Said document neither discloses that a first portion of the material may be transparent, nor that any element may be embedded in the body. There is not any suggestion that the use of the proposed method of manufacturing may result in an improved optical performance of the device. Furthermore, it is not clear whether the molded board can have a support function and act as a structural element in a device.

From EP-A 1,207,685 a chip scale package is known, in which a pattern of conductors and an integrated circuit are embedded in one body. However, the body does not contain a portion of transparent material. Furthermore, the shape of this package is not derived from its application but simply block-shaped. And the contact pads in the pattern are not laterally displaced with respect to the electrical element.

The light path may be present between the optical element and another component in the body or at the surface of the body. Alternatively, it may lead from the optical element to the surface of the body. The design of the light path thus depends on the application.

In a first embodiment, the light path is present between the optical element and a surface area of the body suitable for assembly of an opto-electrical or electro-optical element. Here the optical element and the other element are optically interconnected. Particularly if the opto-electrical or electro-optical element includes an interface to a user, this location at the surface is preferable. An example hereof is the combination of a liquid crystalline display and several diodes for backlighting, the diodes being the embedded optical elements and the display being the electro-optical element. Another example is a camera with an electrically driven lens, for instance based on the electro-wetting principle, and an image sensor. Generally, the light path between a lens and a sensor is realized with a through-hole. However, if the lens is completely embedded, the first portion may act as lens package and as light path, thereby removing the interface.

There are various ways of providing electrical contact between the conductors at the surface of the body and the electro-optical element at the surface, particularly if the electro-optical element is a liquid-crystalline display. One option is the provision of a flexible portion at an edge of the body, which can then be heat-sealed to the display using an anisotropic conductive film pressed between the flexible portion and the display and cured with heat. The small disadvantage hereof is the additional process step for the provision of a flexible portion. Another option is heat-sealing the body directly to the display. In this case the electrically insulating material must be heat resistive. This limits the choice of the materials to rigid materials and sets further requirements to the allowed amount of surface roughness in the molding process. A third, preferable, option is that the display is glued directly on the transparent portion of the body with an anisotropic conductive adhesive. This adhesive is subsequently cured using ultraviolet radiation. The adhesive can be applied as a laminated film. The preferred alternative is that a paste with conductive particles is dispensed on the body with the conductors. This is then exposed to ultraviolet radiation which passes through the body, or through a portion of the display. It is an advantage of this method of assembly that the number of contacts made can be very large and that the pitch can be small. It thus becomes possible that the display driver integrated circuit is embedded in the body. This reduces the amount of assembly steps, compared to the alternative where the driver integrated circuit is assembled to the display.

In a second embodiment, the light path is present between the optical element and an opto-electrical element or electro-optical element that is also embedded in the body and is electrically connected to the pattern of conductors. Applications hereof include embodiments in which the display and the image sensor are also integrated in the body. However, there is a further range of applications in the sphere of optical transmission of data. A first application is the combination of a laser diode and a photodiode in a dual-wavelength optical transceiver module. This application is known per se from EP-A 733288. Another application is the optical communication between two semiconductor elements. This application has been described in the non-prepublished application EP02079915.1 (PHNL021172). It is preferred that the body is provided with attachment means for attachment of external components and an optical fiber in particular. A good attachment of an optical fiber to a photodiode is very important for an adequate transmission of optical signals from the fiber to the photodiode. This turns out to be a limiting factor in the integration of photodiodes in various modules. The three-dimensional shape allows however a good and nevertheless simplified attachment. First of all, a V-shaped groove can be present for the optical fiber. Then clamping or other suitable attachment means—such as those based on complementary shapes—can be used to enable that the end of the fiber is aligned well with the photodiode.

In a third embodiment, the light path is present between the optical element and a surface area of the body, and a further electrical element is electrically connected to the pattern of conductors, the pattern of conductors comprising an interconnect between the further electrical element and the optical element. In this embodiment, the elements are mutually connected electrically only. Applications of this embodiment include systems in which the optical element is a photosensitive sensor, whereas the further element is electro-optical, such as a light-emitting diode or a display. The output of the sensor is thus used as an input for the further element. Further included are systems in which the optical element is used for the reception of energy and optionally signals, and the further element uses the energy and processes the signals. An example is an integrated circuit integrated in an optical disc or card, that is provided with a photodiode for power and data transmission. In another example the optical element is a solar cell and the further element a microprocessor, the body as a whole being a clock or a radio or the like and further being provided with all necessary features and possibly a rechargeable battery to be loaded with the energy from the solar cell. The advantage of this implementation is twofold: first, the body may have the shape of the desired product. Secondly, the pattern of conductors can be designed so as to minimize electrical losses.

Regarding the elaboration of the conductors in the body, the following is observed:

the first portion in the body of the invention may be as large as the complete body. The minimal size originates from the requirement of the continuous light path. The first portion may be limited to a certain area in that the body is provided in a process wherein more than one molding operation is performed, for instance with the help of a mold with two chambers. The first portion may be limited in all directions; an example is that the transparent first portion is completely or nearly completely overmolded with a non-transparent plastic.

The pattern of conductors is provided within the body with the aid of a sacrificial layer that is removed after the molding operation. However, there are several tricks through which the pattern of conductors can be partly or completely embedded in the body. First of all, a further molding or coating step might be carried out after removal of the sacrificial layer. Secondly, the sacrificial layer may be substantially removed in a first area before the molding step, without damaging the pattern of the conductors. The conductors will then be provided inside the body within the first area. The removal of the sacrificial layer can be realized by cutting, thereby separating the individual conductors. Part of the sacrificial layer, may and will be maintained and embedded with the conductors into the body. Thirdly, it is possible to use underetching of the pattern of conductors in combination with conductors of different width. The space created by the underetching will be filled by the material of the body. The pattern of conductors may further be folded prior to inclusion in the body, so as to provide it along a first and a second face of the body, or even to contact devices present at opposed sides.

The laterally displaced connection means will be used for contacting carriers, connectors or components. Examples of connection means include contact pads or regions for galvanic coupling, antennas for wireless connection and capacitor plates for capacitive coupling. In case a connector is used, it is preferably secured to the body by overmolding; it is positioned on the pattern of conductors before the provision of the body, but is not completely embedded in the body. In case a flex foil connection is desired, this flex foil can be integrated into the body by providing the body with a portion of an elastic material.

In a preferred embodiment, the conductors are anchored mechanically in the body. The mechanical anchoring is realized in that the conductors are not block-shaped prior to the molding step, but have another shape. In a first example the conductor extends into the sacrificial layer, in which layer it has a reduced diameter. This is realized by underetching. In a second example the conductor is provided with the shape of a mushroom. This is realized by electroplating the conductors to the extent that the conductors extend above the resist used to provide the desired pattern. In a third example, the conductors are basically three-layered stacks, with the middle layer having a different diameter (particularly smaller) than the upper and lower layer. This difference in diameter is for instance realized with selective etching of the material of the middle layer as compared to the other layers.

It is furthermore preferred, particularly in case the material or materials of the body are provided by means of insert molding, to use additional coatings for improved adhesion between the metal and the polymeric material. Such coatings are for instance based on copolymers of alkylacrylates and acrylic acids.

It is furthermore preferred that the body is provided with means for mechanical attachment of at least one external component. Such a component can be an electrical component, such as a display, an optical component, such as a lens and a mechanical component such as a casing. The means for mechanical attachment include cavities, through-holes, clamping means, corresponding shapes so as to enable a locker and key mechanism, a screw thread and the like as known per se. Particularly preferred is a cavity fitted for the external component.

Any further elements besides the optical element may be integrated in the body and electrically connected to the pattern of conductors. These further elements can be auxiliary components such as resistors, capacitors, inductors, filters and diodes. However also signal processing units such as a display driver integrated circuit can be provided into the body. The latter sets additional requirements on the pitch of the conductor pattern, which can be met for instance with a foil based on a sacrificial layer of Al and a conductor pattern of Cu, which pattern is mechanically anchored into the body.

These and other aspects of the body and the device of the invention will be further explained with reference to the Figures, in which:

FIG. 1 shows a perspective, diagrammatic and exploded view of a prior art device;

FIG. 2 shows a perspective, diagrammatic and exploded view of a device of the invention;

The Figures are not (completely) drawn to scale and equal reference numbers in different Figures refer to similar parts.

Figure 3:
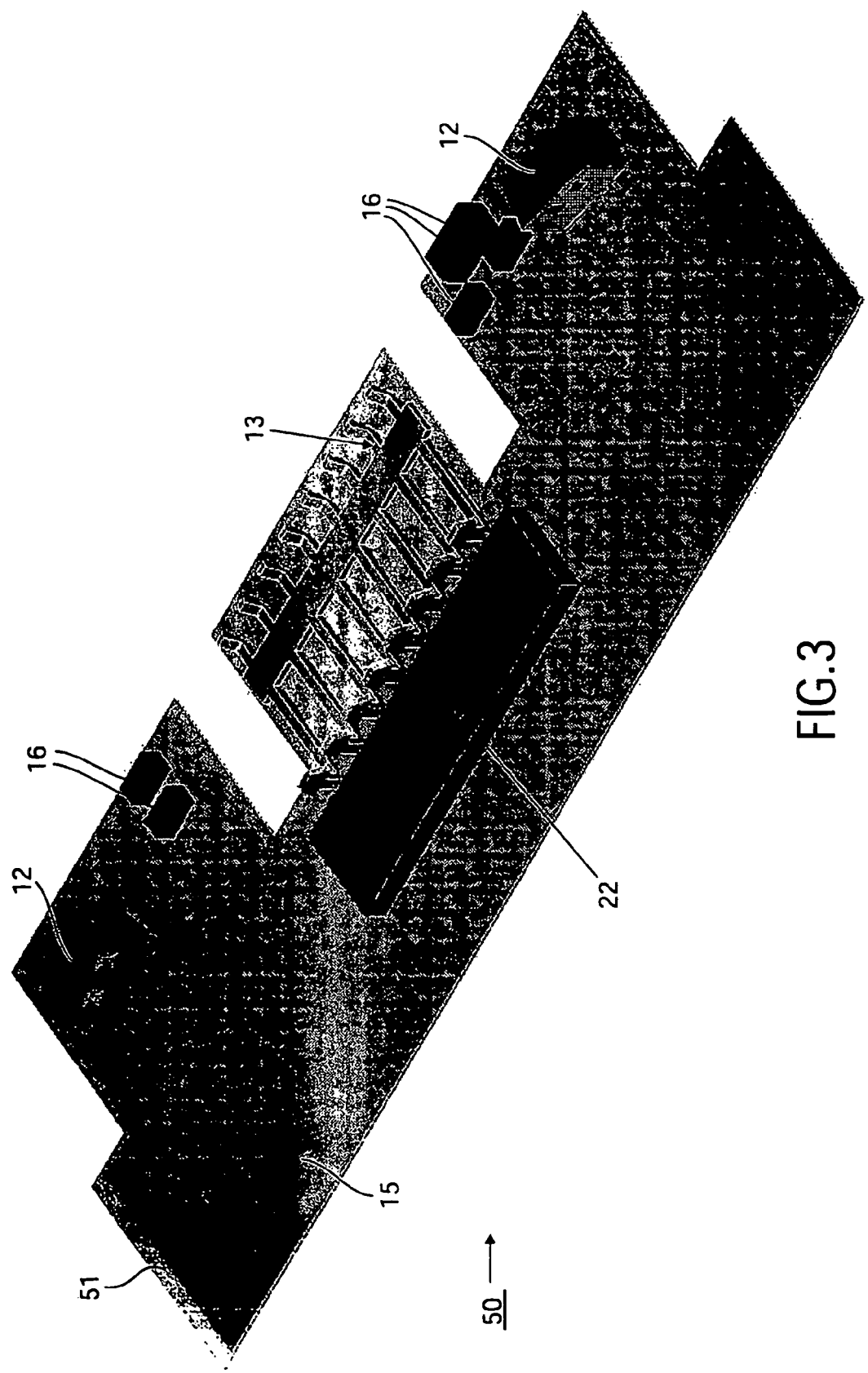
FIG. 3 shows a perspective, diagrammatic view of the foil with components before molding.

FIG. 2 shows a perspective, diagrammatic and exploded view of a device of the invention. The device comprises a body 10 having a three-dimensional shape that is derived from its application. In this case, the body is shaped to be suitable as mechanical support for all components at the user interface side in a mobile phone. To this end, holes 18 and clamping means 19 for mechanical attachment of the loudspeaker 30, the casing 40 and non-shown buttons are present. A pattern of conductors 15 is present at a surface of the body 10. Light-emitting diodes 12, a display driver integrated circuit 22 and other elements 16 are embedded in the body 10 and electrically connected to at least some of the conductors of the pattern 15. Attached to the body 10 is the display 20, through a double sided tape 21, and a loudspeaker 40. The body 10 is covered by a casing 40 for esthetic reasons.

Figure 4:
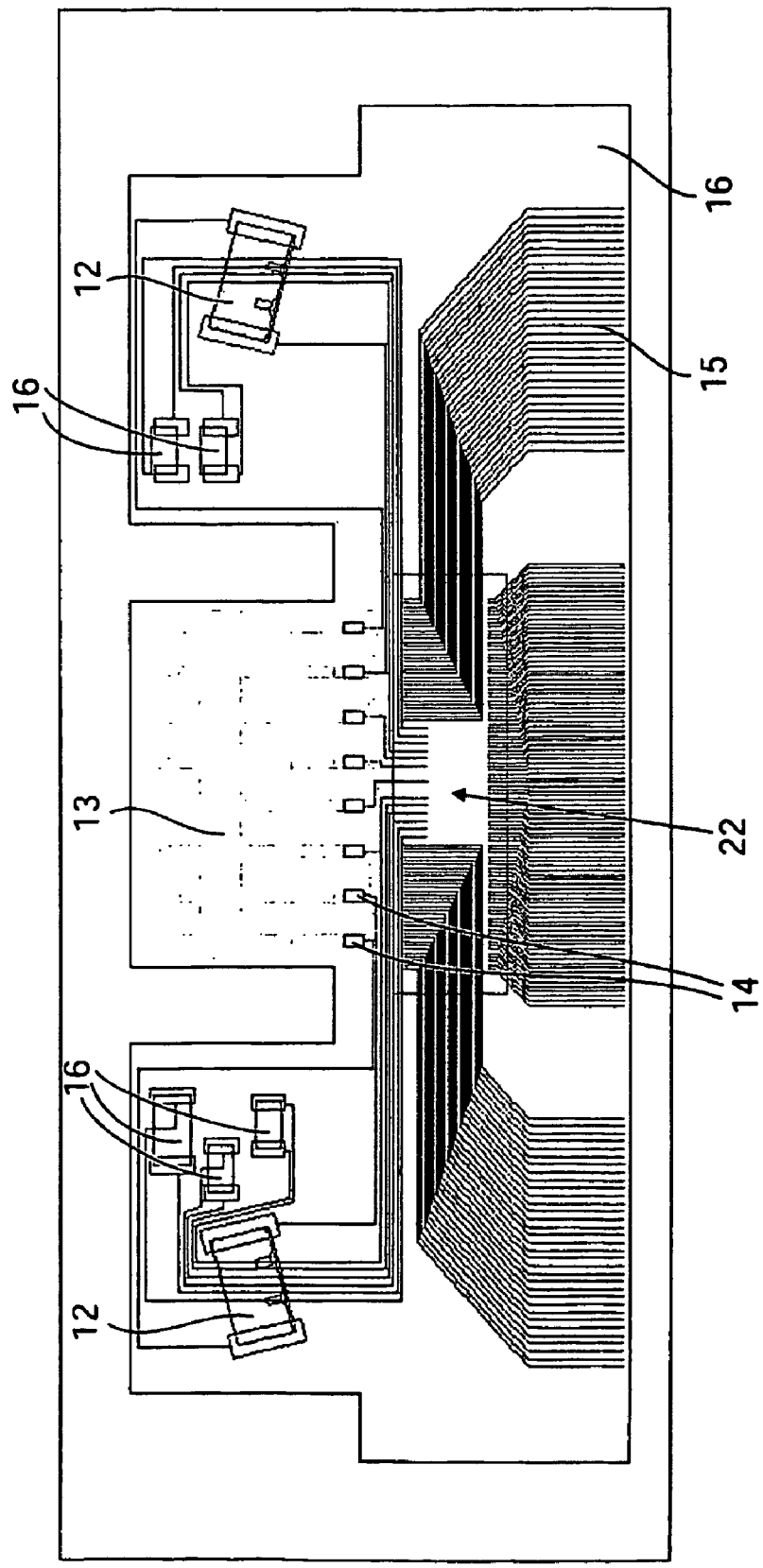
FIG. 4 shows a diagrammatic top view of the layout of the pattern of conductors.
Figure 5:
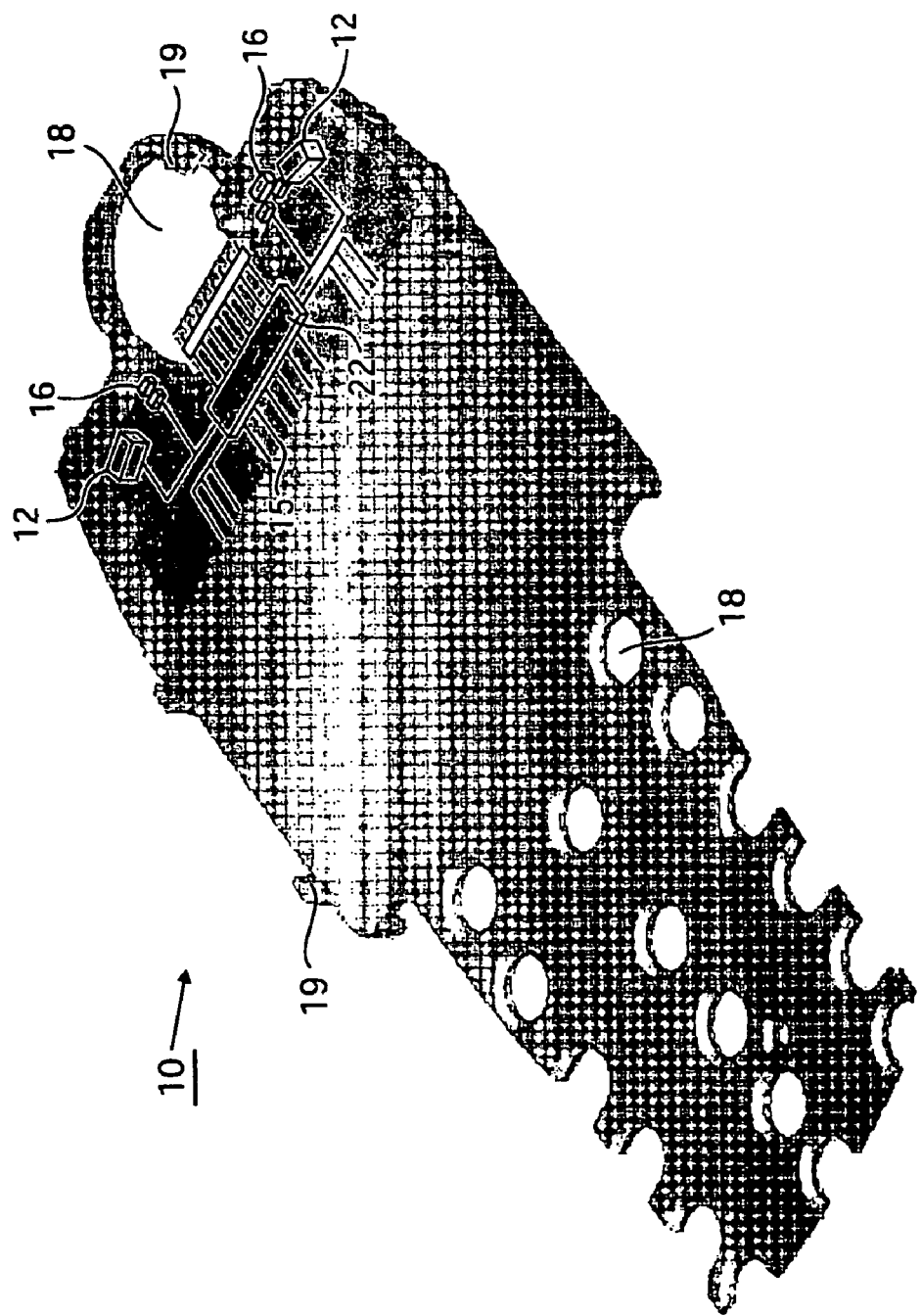
FIG. 5 shows a perspective, diagrammatic view of the body.

FIGS. 3 and 5 show two stages in the manufacture of the body 10 of the invention. In a first step, a foil 50 is provided comprising a sacrificial layer 51 and the pattern of conductors 15, that is not shown specifically in FIG. 3, but in FIG. 4. In this example, the foil 50 comprises a sacrificial layer 51 of Al and conductors of Cu. A layer of NiAu is provided on top of the conductors 15 so as to improve the solderability. The foil in this example is prepared using an etching step and a cutting step. In the etching step, first the copper layer is etched into the pattern of conductors 15, for instance with ferrichloride. Thereafter the etching is continued into the aluminum to create the required underetching. Aluminum can be etched selectively with respect to copper using a solution of sodium hydroxide. In the cutting step, the sacrificial layer 51 is partly cut away, so that the overall outline fits into the desired shape of the body. The light emitting diodes 12, the display driver integrated circuit 22 and other elements 16, in this case surface mountable resistors and capacitors, are provided. In addition, a connector 13 is provided. The connector 13 is provided with hooks at the end at which it is attached to the pattern of conductors, to ensure fixation after the overmolding operation.

FIG. 4 shows a diagrammatic top view in which the layout of the pattern of conductors 15 is shown. As is clear from this Figure, there are two light-emitting diodes 12, that are positioned at a mutual angle of about 22°. After provision of the body, the emitted light will go into the body directly and will uniformly and completely illuminate the part of the body present under the display 20. It is an advantage of the embedding in question that use can be made of light-emitting diodes without a package and without a lens for focusing purposes. However, packaged light-emitting diodes can be used as well. As is furthermore clear from this Figure, the contact pads 14 for contacting the connector are laterally displaced with respect to the optical elements, i.e. the light-emitting diodes 12, and also with respect to the display driver integrated circuit 22. The contact pads 14 have a diameter which is larger than that of the rest of the pattern 15.

FIG. 5 shows a perspective, diagrammatic view of the body. This body is provided by insert molding of polycarbonate, in a manner known to the skilled person. Afterwards, the sacrificial layer 51 is removed by etching, and the fingers of the connector 13 are bent. The body is now ready for use and integration into the device 100. The display 20 and the loudspeaker 30 can be attached at the side at which the pattern of conductors 15 is present at the surface.

Figure 6:
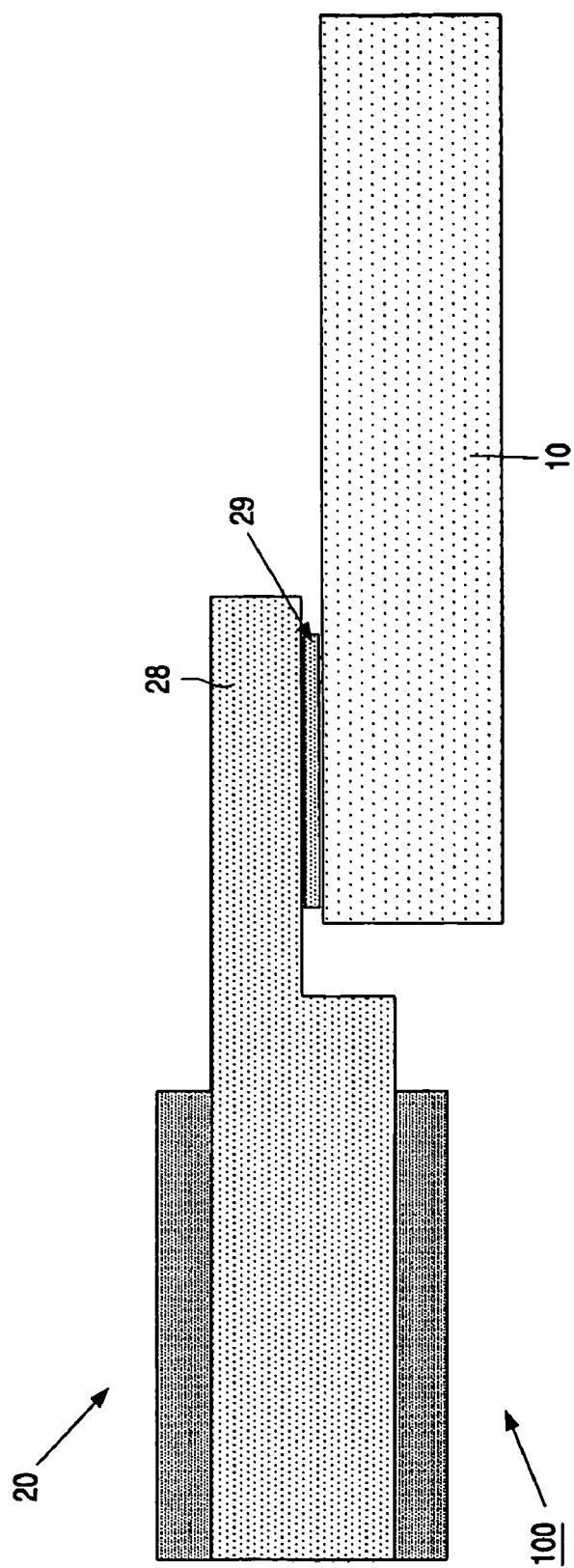
FIG. 6 shows a diagrammatic cross-sectional view of a part of the device of the invention.

FIG. 6 shows a diagrammatic cross-sectional view of a part of the device of the invention. This clarifies the attachment of the display 20 to the body 10. Although not shown here, it is preferred that the body 10 extends so as to act as mechanical support for the display 20. The display 20 and the body 10 are attached to one another with an anisotropically conducting adhesive 29, that is provided at selected regions of the surface of the body 10. To this end, the display 20 is provided with an edge 28, made of glass, at a surface of which transparent conductors, in this example of indium tin oxide (ITO) are present. The adhesive 29 is cured either through the glass edge 28 of the display 20 or through the body 10.

FIG. 7-11 show perspective diagrammatic views of a second embodiment of the invention. A first difference with the first embodiment is that the display driver 22 is not integrated in the body, but attached to the display 20. Another difference is that the other elements 16 and the connectors 13 are encapsulated in a specific encapsulation 60. By virtue thereof, further freedom is achieved in the choice of the encapsulant, so as to provide additional chemical resistance and mechanical strength. Additionally, this encapsulation 60 is provided with cavities 61,62 so as to improve the mechanical adhesion. A further difference is that the foil 50 is bent at its edge 52. This improves the connection to the display.

Figure 7:
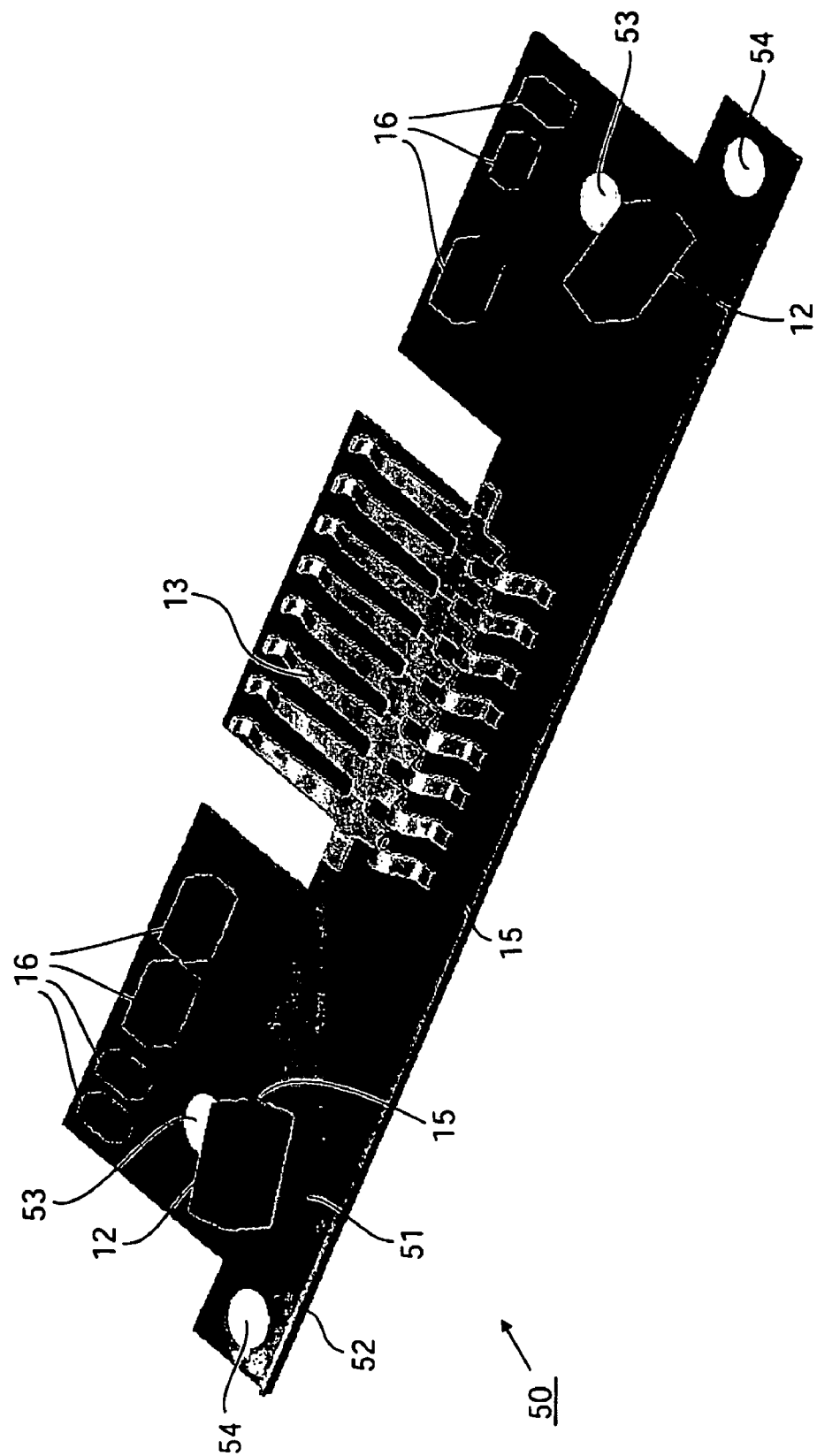
FIGS. 7-11 show perspective, diagrammatic views of a second embodiment of the foil, the body and the device of the invention.

FIG. 7 shows the foil 50 with the elements 12,16 and the connectors 13. The pattern of conductors 15 is shown partially, and additional through-holes 53,54 are provided, so-called pilot holes. At this stage the foil 50 is bent, so as to create the edge 52.

Figure 8:
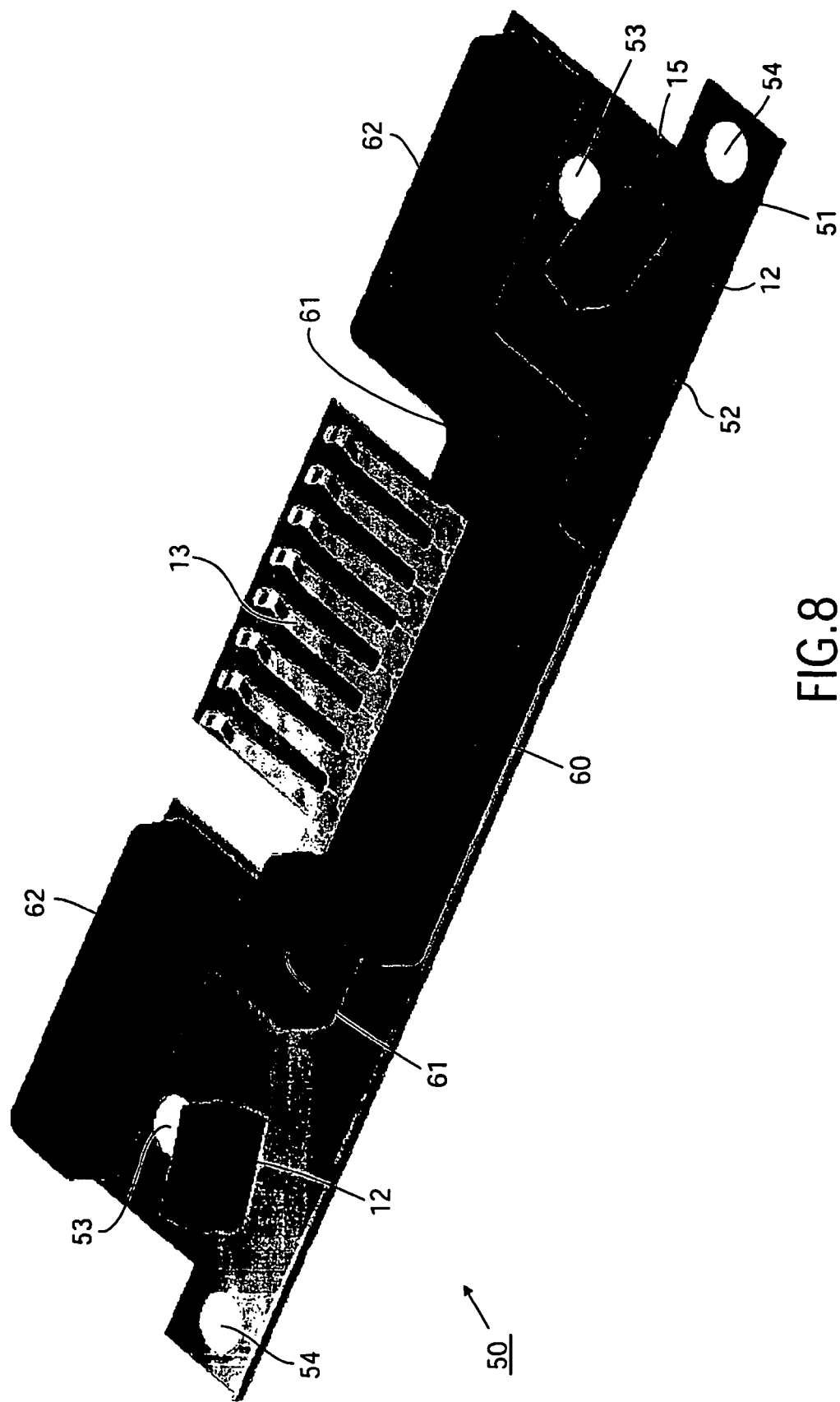

FIG. 8 shows the foil 50 after the other elements 16 and the connector 13 is partially overmolded. Use is made of the molding material polyphenylenesulfide (PPS). However, other engineering plastics can be used alternatively. The created encapsulation 60 is provided with cavities 61,62 for improved mechanical attachment and is given a shape such that it is not present in (?) the light path.

Figure 9:
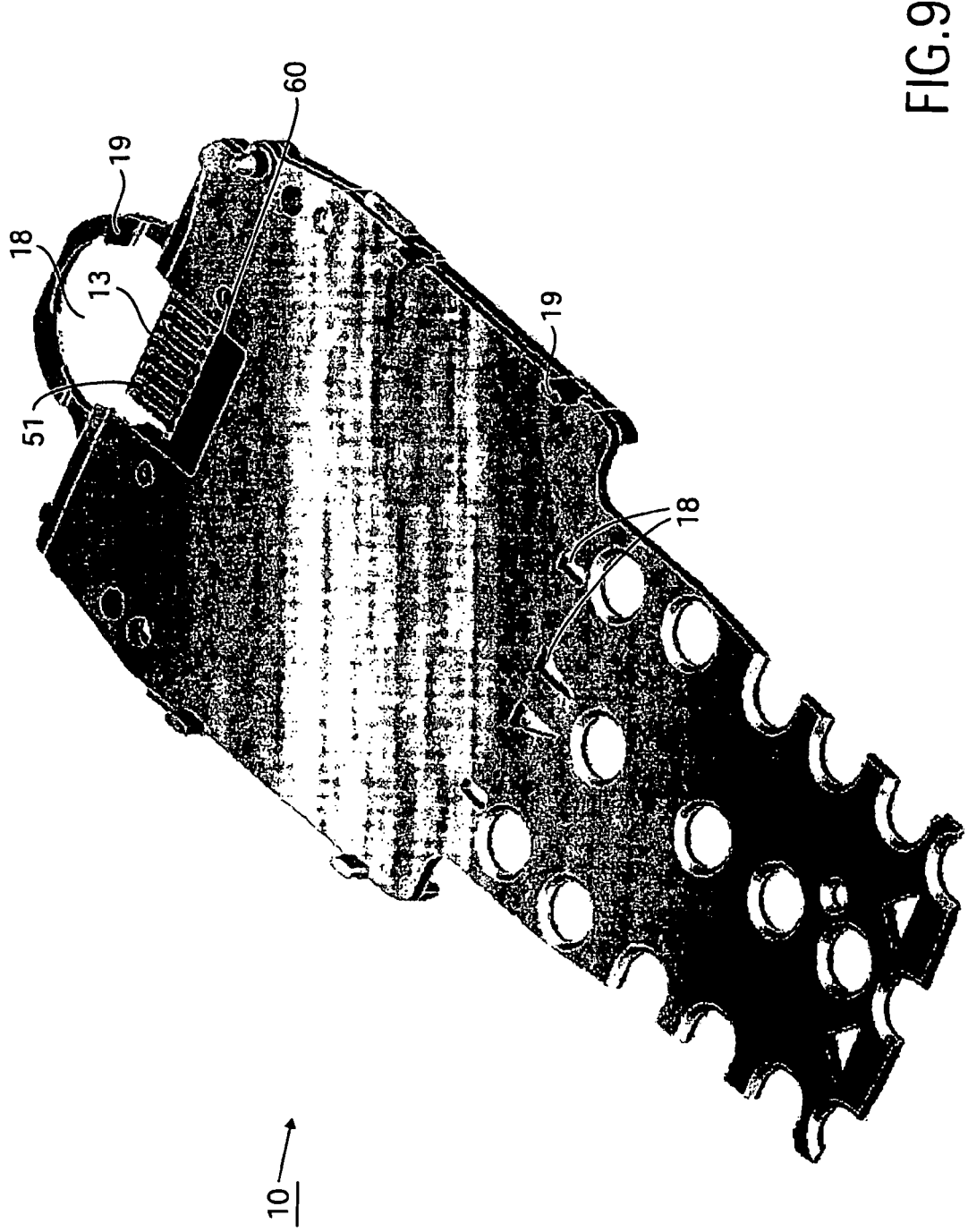

FIG. 9 shows the body 10 that has been formed by application of a second molding material. It is provided with through-holes 18 and cavities for mechanical attachment. A transparent material is used as the second molding material, in this case polycarbonate, and the light-emitting diodes 12 are encapsulated therein. The attachment of the polycarbonate to the PPS may be improved by subjecting the PPS first to a surface treatment, by an adequate choice of the mold of the PPS so as to provide it with a mechanically rough surface, by carrying out a heat treatment which will lead to adhesion between both molding materials, etc.

Figure 10:
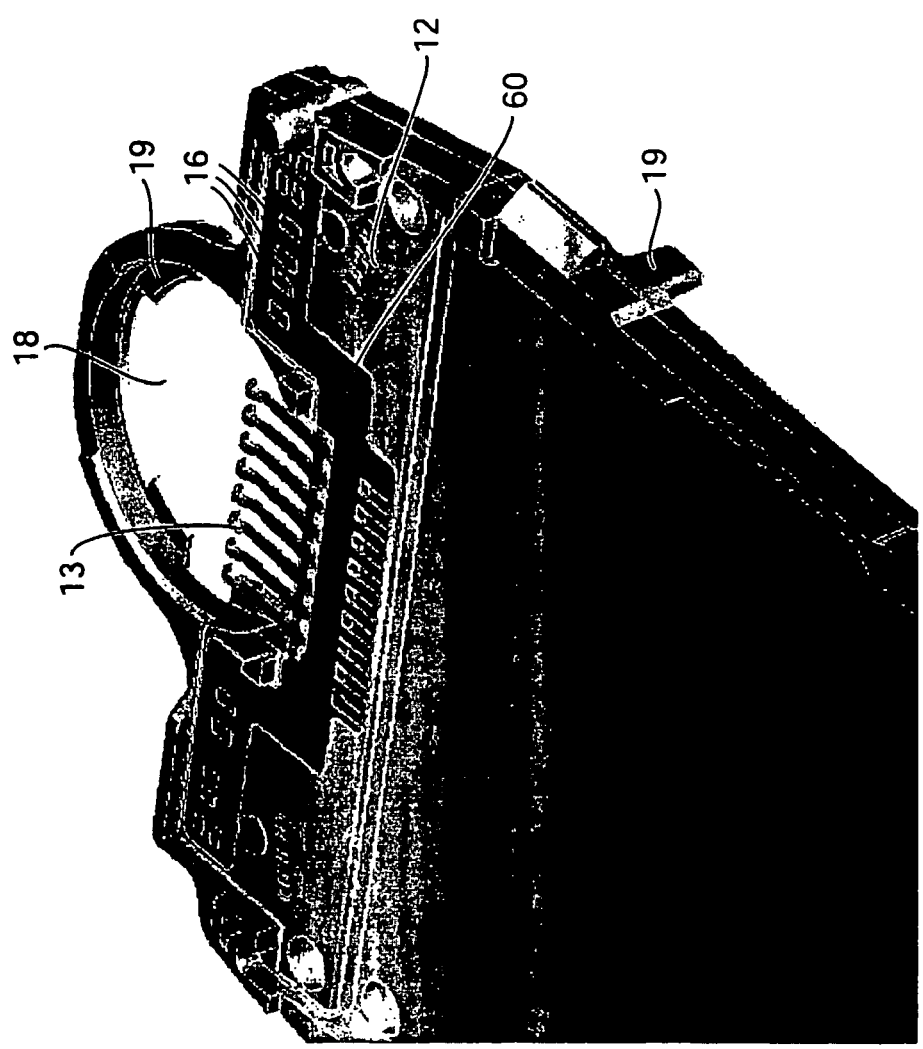

FIG. 10 shows the body 10 from the opposite side in comparison with FIG. 9, and after the sacrificial base layer 51 has been removed by etching. The conductors that connect the other elements 16, the diodes 12 and the connector springs 13 are exposed at the surface (although not shown).

Figure 11:
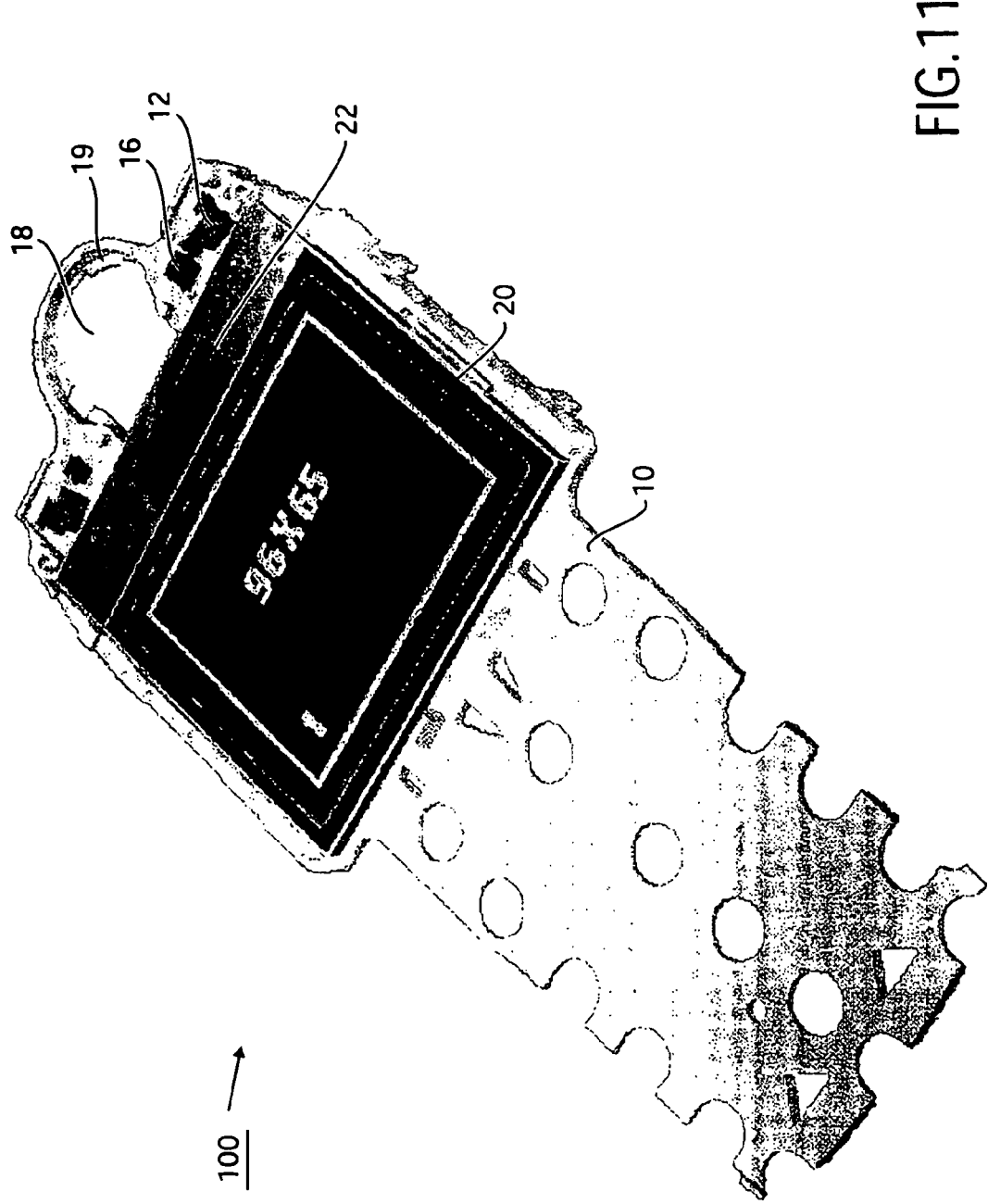

FIG. 11 shows the resulting device 100, after the display 20 with the display driver IC 22 attached to it, is provided on the body 10. The diodes 12 now shine in the light path through the body 10, which results in backlighting of the display 20. In order to optimize such light guide behavior, the body 10 is provided with adequate surface structures.

The invention claimed is:

1. A one-piece body of electrically insulating material having a three-dimensional shape derived from its intended function said body defining a plane having a longitudinal and a lateral and a perpendicular directions, said body being molded in one piece and provided with a pattern of electrical conductors extending with said body in the plane of said body, and at least one optical element being integrally formed with and embedded in said one-piece body, the optical element being electrically connected to the pattern of conductors, the pattern of conductors being provided with electrical connection means that are laterally displaced with respect to the optical element, and said one-piece body comprising a first portion with a transparent, electrically insulating material constituting a light path to the optical element, wherein the light path is present between the optical element and one of an opto-electrical element and an electro-optical element that is also embedded in the one-piece body and is electrically connected to the pattern of conductors.

2. The one-piece body as claimed in claim 1, wherein the light path is present between the optical element and a surface area of the one-piece body suitable for assembly of an opto-electrical or electro-optical element.

3. The one-piece body as claimed in claim 1, wherein:
the light path is present between the optical element and a surface area of the one-piece body,
a second electrical element is electrically connected to the pattern of conductors, the pattern of conductors comprising an interconnect between the second electrical element and the optical element.

4. The one-piece body as claimed in claim 3, wherein a selected one of the optical element and the second electrical element is a light sensitive element and the non-selected element is an electro-optical element, a second light path being present between the second element and a surface area of the one-piece body.

5. The one-piece body as claimed in claim 1, wherein the pattern of conductors is provided at least partially at a surface of the one-piece body and is provided with contact pads for establishing electric contact to an element that is to be assembled at the surface of the one-piece body.

6. The one-piece body as claimed in claim 5, wherein the conductors are mechanically anchored in the one-piece body.

7. The one-piece body as claimed in claim 1, wherein the one-piece body has a three-dimensional shape that comprises means for mechanical attachment of at least one external component to the one-piece body.

8. The one-piece body as claimed in claim 7, wherein the means include a cavity fitted for the external component.

9. An electronic device comprising a one-piece body of electrically insulating material having a three-dimensional shape derived from its intended function said body defining a plane having a longitudinal and a lateral and a perpendicular directions, said body being molded in one piece and provided with a pattern of electrical conductors extending with said body in the plane of said body, and at least one optical element being integrally formed with and embedded in said one-piece body, the optical element being electrically connected to the pattern of conductors, the pattern of conductors being provided with electrical connection means that are laterally displaced with respect to the optical element, and said one-piece body comprising a first portion with a transparent, electrically insulating material constituting a light path to the optical element and at least one of an opto-electrical and an electro-optical element attached to the surface of the one-piece body, wherein the embedded optical element is a light-emitting diode and the electro-optical element is a display, and wherein the light-emitting diode is used as backlight for the display, the light path being present in between the light-emitting diode and the display.

10. The one-piece body as claimed in claim 1, wherein the one-piece body is molded as a mechanical support for a display.

11. The one-piece body as claimed in claim 1, wherein all of the one-piece body is transparent.

12. The one-piece body as claimed in claim 1, wherein the one-piece body comprises a flexible portion at an edge of the one-piece body.

* * * * *